US009859828B2

(12) United States Patent
Tarnowski et al.

(10) Patent No.: US 9,859,828 B2
(45) Date of Patent: Jan. 2, 2018

(54) POWER PLANT AND ENERGY STORAGE SYSTEM FOR PROVISION OF GRID ANCILLARY SERVICES

(71) Applicant: VESTAS WIND SYSTEMS A/S, Aarhus N (DK)

(72) Inventors: Germán Claudio Tarnowski, Misiones (AR); Philip Carne Kjær, Aarhus (DK); Rasmus Lærke, Viby J (DK); Florin Iov, Aalborg (DK); Remus Teodorescu, Aalborg (DK); Andrzej Adamczyk, Stafford (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 150 days.

(21) Appl. No.: 14/765,468

(22) PCT Filed: Feb. 7, 2013

(86) PCT No.: PCT/DK2013/050032
§ 371 (c)(1),
(2) Date: Aug. 3, 2015

(87) PCT Pub. No.: WO2014/121794
PCT Pub. Date: Aug. 14, 2014

(65) Prior Publication Data
US 2015/0381089 A1    Dec. 31, 2015

(51) Int. Cl.
*H02J 1/00*    (2006.01)
*H02P 9/14*    (2006.01)
(Continued)

(52) U.S. Cl.
CPC ............. *H02P 9/14* (2013.01); *F03D 7/0284* (2013.01); *F03D 7/045* (2013.01); *F03D 9/11* (2016.05);
(Continued)

(58) Field of Classification Search
CPC ........ H02J 3/24; H02J 3/28; H02J 3/38; H02J 3/386; H02P 9/14; F03D 9/11
(Continued)

(56) References Cited

U.S. PATENT DOCUMENTS

2011/0074151 A1* 3/2011 Burra .................. H02J 3/24
290/44
2011/0320052 A1    12/2011 Yasugi

FOREIGN PATENT DOCUMENTS

DK    WO 2011150932 A2 *  12/2011    ............ H02J 3/1828
EP    2306001 A2    4/2011
(Continued)

OTHER PUBLICATIONS

International Search Report for PCT/DK2013/050032, dated Nov. 20, 2013.

*Primary Examiner* — Thomas Skibinski
(74) *Attorney, Agent, or Firm* — Patterson + Sheridan, LLP

(57) ABSTRACT

The present invention relates to method for operating a power plant, with at least one wind turbine generator arranged for supplying power to an electrical grid, at least one energy storage device arranged for supplying power to the electrical grid, and a power plant controller, the method comprises, measuring repetitively measurement sets of at least one electrical parameter from the electrical grid, and calculating, in respect the measurement sets of the at least one electrical parameter, a change in active and/or a required change in reactive power at a point of common coupling, and calculating and dispatching of a first control reference signal to the at least one wind turbine generator and a second control reference signal to the at least one energy storage device, for providing ancillary service functionalities to the electrical grid. The invention also relates to a power plant with at least one wind turbine generator for supplying power to an electrical grid, at least one energy storage device for supplying power to the electrical grid, and a power plant controller for providing ancillary service functionalities to the electrical grid.

20 Claims, 10 Drawing Sheets

(51) Int. Cl.
*H02J 3/24* (2006.01)
*H02J 3/28* (2006.01)
*H02J 3/38* (2006.01)
*F03D 7/02* (2006.01)
*F03D 7/04* (2006.01)
*F03D 9/11* (2016.01)

(52) U.S. Cl.
CPC .................. *H02J 3/24* (2013.01); *H02J 3/28* (2013.01); *H02J 3/38* (2013.01); *H02J 3/386* (2013.01); *F05B 2270/337* (2013.01); *F05B 2270/404* (2013.01); *Y02E 10/723* (2013.01); *Y02E 10/763* (2013.01); *Y02E 10/766* (2013.01); *Y02E 70/30* (2013.01); *Y02P 90/50* (2015.11)

(58) Field of Classification Search
USPC .................. 307/84, 43; 290/44, 50; 700/287
See application file for complete search history.

(56) References Cited

FOREIGN PATENT DOCUMENTS

EP 2573895 A1 3/2013
WO 2011/150932 A2 12/2011

\* cited by examiner

POWER PLANT AND ENERGY STORAGE SYSTEM FOR PROVISION OF GRID ANCILLARY SERVICES

FIELD OF THE INVENTION

The present invention generally relates to electrical power generation and, more specifically, to methods and systems for use in optimizing the power output produced by a power plant that includes a power generating unit and an energy storage device.

BACKGROUND OF THE INVENTION

A wind power plant, or wind park, includes a group of wind turbines that operate collectively as a power plant that generates a power output to a power grid. Wind turbines can be used to produce electrical energy without the necessity of fossil fuels. Generally, a wind turbine is a rotating machine that converts the kinetic energy of the wind into mechanical energy and the mechanical energy subsequently into electrical power.

A wind power plant could also include an energy storage device, such as one or more rechargeable batteries or flywheels, that are also linked to the power grid and that may assist with meeting requirements on the power production by the power plant. When energy demand peaks, the wind turbines of the wind power plant will sink energy directly into the power grid. When energy demand is diminished, excess energy from the wind turbines may be stored in the energy storage device and later discharged to the power grid upon demand to alleviate any deficits in output requirements for the power plant.

The conventional approach is to decide the control actions for the wind turbines independently of the energy storage operating conditions. That is, conventional wind power plant and wind turbine controls are designed to capture as much energy as possible from the wind as long as the stresses on turbine components are acceptable, regardless of the energy storage conditions; e.g., state of charge, remaining life time, etc. Under this conventional approach, the presence of the energy storage device does not have any direct impact on the control decisions for the wind turbines. Charging or discharging of the energy storage device is implemented only after the control actions for the wind turbines are decided.

Stability is a condition of equilibrium between opposing forces. The mechanism by which interconnected synchronous machines maintain synchronism with one another is through restoring forces, which act whenever there are forces tending to accelerate or decelerate one or more machines with respect to other machines. Under steady-state conditions, there is equilibrium between the input mechanical torque and the output electrical torque of each machine, and the speed remains constant. If the system is perturbed this equilibrium is upset, resulting in acceleration or deceleration of the rotors of the machines according to the laws of motion of a rotating body. For a power system with a large penetration of power produced by wind turbine generators or other renewable power sources, there is an increasing demand for providing performance of the wind power plant, so it perform like a regular traditional power plant with synchronous machine. Such a power plant is in the present application called a virtual power plant.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Under the conventional approach, operational control is not necessarily optimized from the overall perspective of the power plant; that is, from the perspective of the wind power plant and the energy storage as a system. For example, the lack of coordinated control actions can lead to unnecessary consumption of the lifetime of the energy storage device and/or the lifetime of the wind turbines. As another example, the energy storage device may be operated outside the range of preferred operating parameters (currents, voltages, temperatures, etc.) leading to very low efficiencies. As yet another example, the lack of coordinated control actions may yield wind turbine operation at unnecessarily large actuator rates of change to, for example, the rotor pitch. As yet another example, when a wind gust hits the turbine, the energy storage device can be used to absorb or release power and thus reduce the power oscillations that would be otherwise passed to the power grid. By operating the wind turbines without directly acknowledging the conditions of the energy storage device, system-level objectives are in general not optimized.

The need for ancillary services in power systems increases as wind power penetration grows, since wind power introduces balancing issues (among others) due to its natural variability and wind turbine technologies do not naturally behave as synchronous machines. Additionally, with increasing wind power penetration, decommissioned conventional plants are not replaced, which further reduces the stability and control capability of the power system.

Power systems with high amounts of renewable generation must address the future sources of ancillary services—power system stabilising features—as operating non-renewable generation simply as spinning reserve is expected to be prohibitively expensive.

A known problem in the prior art are among others that the eigenfrequencies of the electrical grid and wind turbine mechanical structure (i.e. tower, blades, drivetrain) are typically in the same range, modulation of active power output for wind turbines may lead to adverse interaction between its mechanical structure and demanded power from the wind turbine generator controller.

In an aspect, the present invention relates to a method for operating a power plant, comprising at least one wind turbine generator arranged for supplying power to an electrical grid, at least one energy storage device arranged for supplying power to the electrical grid, and a power plant controller, the method comprises:
- measuring repetitively measurement sets of at least one electrical parameter from the electrical grid,
- calculating, in respect the measurement sets of the at least one electrical parameter, a change in active and/or a required change in reactive power at a point of common coupling,
- calculating and dispatching of a first control reference signal to the at least one wind turbine generator and a second control reference signal to the at least one energy storage device, for providing ancillary service functionalities to the electrical grid.

An advantage of first aspect is mainly that a power plant is provided for outputting power to a point of common connection with a power grid. The power plant includes a wind power plant with a plurality of wind turbines configured to generate and output a first portion of the power to the point of common connection. The power plant also includes an energy storage system with an energy storage device configured to output a second portion of the power to the point of common connection. It's important here to highlight that the advantage provided is a result of the "combined" response of the assets, i.e. first control reference and second control reference generated in such a way that the "combined" response provides the effect.

A supervisory controller is coupled in communication with the energy storage system and in communication with the wind power plant. The supervisory controller is configured to implement a control algorithm to dynamically compute a first power reference for the first portion of the power output by the wind power plant and a second power reference for the second portion of the power output by the energy storage system.

In an embodiment the method further comprises:
calculating, based on a single measurement set both an active power reference and a reactive power reference for the first control reference signal and,
calculating, based on a single measurement set both an active power reference and a reactive power reference for the second control reference signal and;
wherein the first and second control reference signals allow the operation of the at least one wind turbine generator and of the at least one energy storage device to be independent of each other.

Advantage of this embodiment is that the power generation unit can modulate a specific power output without triggering excitation of mechanical resonances.

Another advantage of this embodiment is that the invention allows simultaneous modulation of both of the VPP controlled outputs (e.g. active and reactive power) to achieve better damping capability per installed MVA compared to known technology. Moreover, taking advantage of different assets within VPP, modulation of wind turbines active power can be avoided if damping control could result in adverse interaction with turbine mechanical structure. More importantly, curtailment of wind turbine generators' active power can be partly or completely avoided if ESS is partly/solely responsible for provision of damping active power.

In an embodiment the power plant controller is divided into a first power plant controller controlling the at least one wind turbine generator, and a second power plant controller controlling the at least one energy storage device.

Generally, the control algorithms of the embodiments of the invention receive information on the status of both the wind power plant and the energy storage, and compute the power references that optimize a given power plant objective subject to a given set of constraints imposed on the power plant. Having the power plant controller divided into two section still require a higher level of coordination.

In an embodiment a partition of the active power reference and the reactive power reference, for the first and second control reference, respectively, is set as a pre-defined ratio.

In an embodiment a partition of the active power reference and the reactive power reference for the first and second control reference, respectively, is calculated online in an optimization algorithm.

Advantage of this embodiment is the specific performances can be reached such as an algorithm can be based on maximum yield, prolonged lifetime etc.

In an embodiment the ancillary service provided is supporting the electrical grid with a primary reserve.

In an embodiment the ancillary service provided is supporting the electrical grid with an inertial response.

In an embodiment the ancillary service provided is supporting the electrical grid with a power oscillating damping.

In an embodiment the method further comprises:
calculating an active power reference for the first power reference for damping an oscillating disturbance in the electrical grid, when the oscillating disturbance has a frequency that is lower than an eigenfrequency of a mechanical structure of the at least one power generator, and/or;
calculating an active power reference for the second power reference for damping an oscillating disturbance in the electrical grid, when the oscillating disturbance has a frequency that is higher than an eigenfrequency of a mechanical structure of the at least one power generator.

In an embodiment the method further comprises:
calculating a reactive power reference for the first power reference for damping a first oscillating disturbance in the electrical grid;
calculating an active power reference for the second power reference for damping a second oscillating disturbance in the electrical grid.

An advantage is that the first and the second oscillating disturbances are independent of each other. One oscillating disturbance can contain more than one oscillation frequency in it. So the first power reference will damp one of the frequencies and the second power reference will damp the other oscillation frequency. This is not a constraint to just one or two oscillation frequencies.

In an embodiment the ancillary service provided is supporting the electrical grid with a synchronizing power, thereby stabilizing the electrical grid.

In an embodiment the power plant further comprise at least one photovoltaic solar power plant and/or at least one micro power turbine and/or thermal solar power plant and/or wave energy plant.

An advantage of this embodiment is that several energy sources can be combined into a virtual power plant. Various renewable energy sources have different power profiles in respect of time that may be beneficial in a combination, i.e. solar power peak right at the time when the solar rays hit the earth, whereas wind power is a side effect of solar heating, and thus air will move from one place to another, causing the wind to blow. An even more delayed action is from wave energy, as ocean waves is a side effect of wind.

In an embodiment the invention regards among others a control method for a virtual power plant (VPP) for damping of oscillatory transients arising after electrical grid disturbances. Virtual power plant mentioned in the invention comprises one or multiplicity of wind turbines generators and/or one or multiplicity of photovoltaic arrays and/or one or multiplicity of solar thermal power units and/or one or multiplicity of energy storage systems (e.g. battery storage, pumped hydro storage, bio-gas storage, hydrogen storage, kinetic storage, etc.) and/or one or multiplicity of micro gas turbines.

A second aspect of present invention relates to a power plant comprising, at least one wind turbine generator arranged for supplying power to an electrical grid, at least one energy storage device arranged for supplying power to the electrical grid, and a power plant controller, arranged with a control algorithm according to claim 1 to claim 12.

A third aspect of present invention relates to a power plant comprising, at least one wind turbine generator arranged for supplying power to an electrical grid, at least one energy storage device arranged for supplying power to the electrical grid and a power plant controller arranged to implement a control algorithm to compute a first power reference for controlling the at least one wind turbine generator and a second power reference for controlling the at least one energy storage device, thereby providing ancillary service functionalities from the power plant to the electrical grid.

The advantages of the second aspect and its embodiments are equivalent to the advantages for the first aspect of the present invention.

The individual aspects of the present invention may each be combined with any of the other aspects. These and other aspects of the invention will be apparent from the following description with reference to the described embodiments.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

Figure 1:
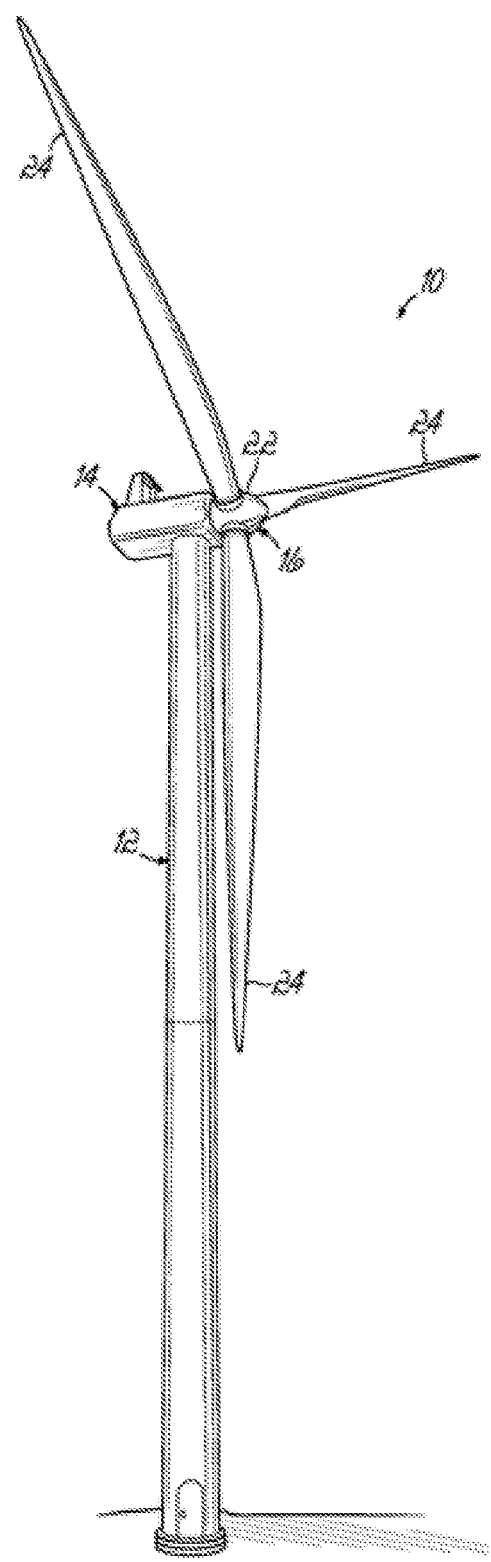
FIG. 1 shows a wind turbine generator.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Power Systems require operations and controls necessary for its stability at several time scales, which are normally referred to as ancillary services, e.g. voltage control, frequency support, power (spinning) reserve, power dispatch and others. Traditionally these ancillary services are supplied by conventional power plants normally equipped with synchronous generators.

As stated in the summary power systems with high amounts of renewable generation must address the future sources of ancillary services—power system stabilising features—as operating non-renewable generation simply as spinning reserve is expected to be prohibitively expensive.

It is well known today that, through appropriate controls, modern Wind Power Plants (WPP) can provide at least some of the same ancillary services as non-renewable generation does.

Plants using variable-speed wind turbines with partial or full power electronic conversion can regulate their active and reactive power output to provide voltage and frequency support, and these are commonly used. Recently, interest has grown in the prospective provision of so-called Inertial Response and Power Oscillation Damping, even further towards providing synchronising power.

An embodiment with a wind power plant augmented with energy storage, configured to provide ancillary services (primary reserve, inertial response, power oscillation damping and synchronising power) for enhancement of power system stability is described in the following pages. Energy storage can complement wind power plants thus reducing the need for any overload or curtailment to allow active power modulation. In an example a 12 MW wind power plant is combined with a 1.6 MW energy storage system plant here used for demonstration of representative performance of the particular ancillary service control algorithms, the application is not limited to a plant of that size it is to be understood as an example, but also to show proof of concept.

Modulating the active power output from wind power plants requires careful consideration. Not only the attention to wind turbine generator structural limitations and its feasible operating range, but equally the net energy loss from any curtailment as well as the forecasted certainty of a firm power reserve. Augmenting the wind power plant with energy storage does not simplify that matter, only renders a different optimum. The business rationale of adding energy storage to a wind power plant depends on to what extent its added cost is outweighed by the added wind energy yield and payment for provision of ancillary services. To reach near-optimum, a number of challenges need be addressed, including:

i. Short-term power forecasting,
ii. Optimal scheduling of turbine output for minimal curtailment during committed reserve power capability,
iii. Optimal power setpoint dispatch between turbines and energy storage system,
iv. Sizing of energy storage system from particular applications & life-cycle cost models (wear-out).

Figure 2:
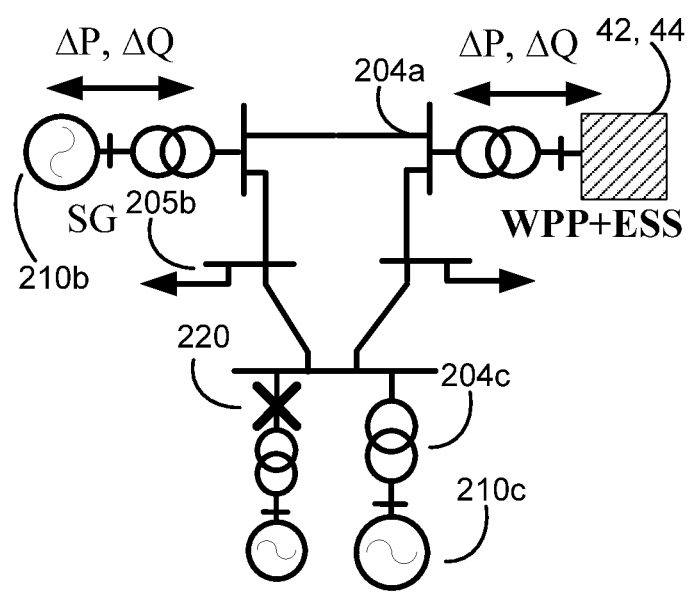
FIG. 2 depicts a generic power system with wind power augmented with an ESS in which a severe contingency (e.g. generation loss) is represented.

With reference to FIGS. 1 and 2 and in accordance with an embodiment of the invention, a wind turbine 10, which is depicted as a horizontal-axis machine, includes a tower 12, a nacelle 14 disposed at the apex of the tower 12, and a rotor 16 operatively coupled to a generator 20 housed inside the nacelle 14. In addition to the generator 20, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 on an underlying foundation. The tower 12 of the wind turbine 10 also operates to elevate the nacelle 14 and rotor 16 to a height above ground level or sea level, as may be the case, at which faster moving air currents of lower turbulence are typically found.

The rotor 16 includes a central hub 22 and a plurality of blades 24 attached to the central hub 22 at locations circumferentially distributed about the central hub 22. In the representative embodiment, the rotor 16 includes a plurality of three blades 24 but the number may vary. The blades 24, which project radially outward from the central hub 22, are configured to interact with the passing air currents to produce aerodynamic lift that causes the central hub 22 to spin about its longitudinal axis. The design, construction, and operation of the blades 24 are familiar to a person having ordinary skill in the art. For example, each of the blades 24 is connected to the central hub 22 through a pitch mechanism that allows the blade to pitch under control of a pitch controller. The nacelle 14 and rotor 16 are coupled by a bearing with the tower 12 and a motorized yaw system (not shown) is used to maintain the rotor 16 aligned with the wind direction.

Any temporary increase in turbine active power ('overload') is, however, subject to limitations in the structural strength of the turbine design, unless the turbine is operated below its available power ('curtailed') prior to the increase in active power. To harvest as much wind energy as possible, operation without curtailment of active power output is preferred and almost exclusively used.

Short-term overload (some per-cent for a few seconds) is known in the prior art, and may be offered by particular turbines when operating in the partial or full load range (i.e. at medium winds or when the available wind power exceeds wind turbine generator nameplate rating). Nevertheless, such action causes a power dip after the turbine's temporary contribution, if the output power exceeds that available from wind. But as a generally valid concept, across all operating conditions, wind power plants can easily offer reduction of active power, while any increase of it requires previous curtailment.

Energy Storage System (ESS) can complement a WPP to offer a combined output, qualifying as ancillary services, with reduced need to curtail or overload the wind turbines.

Figure 3:
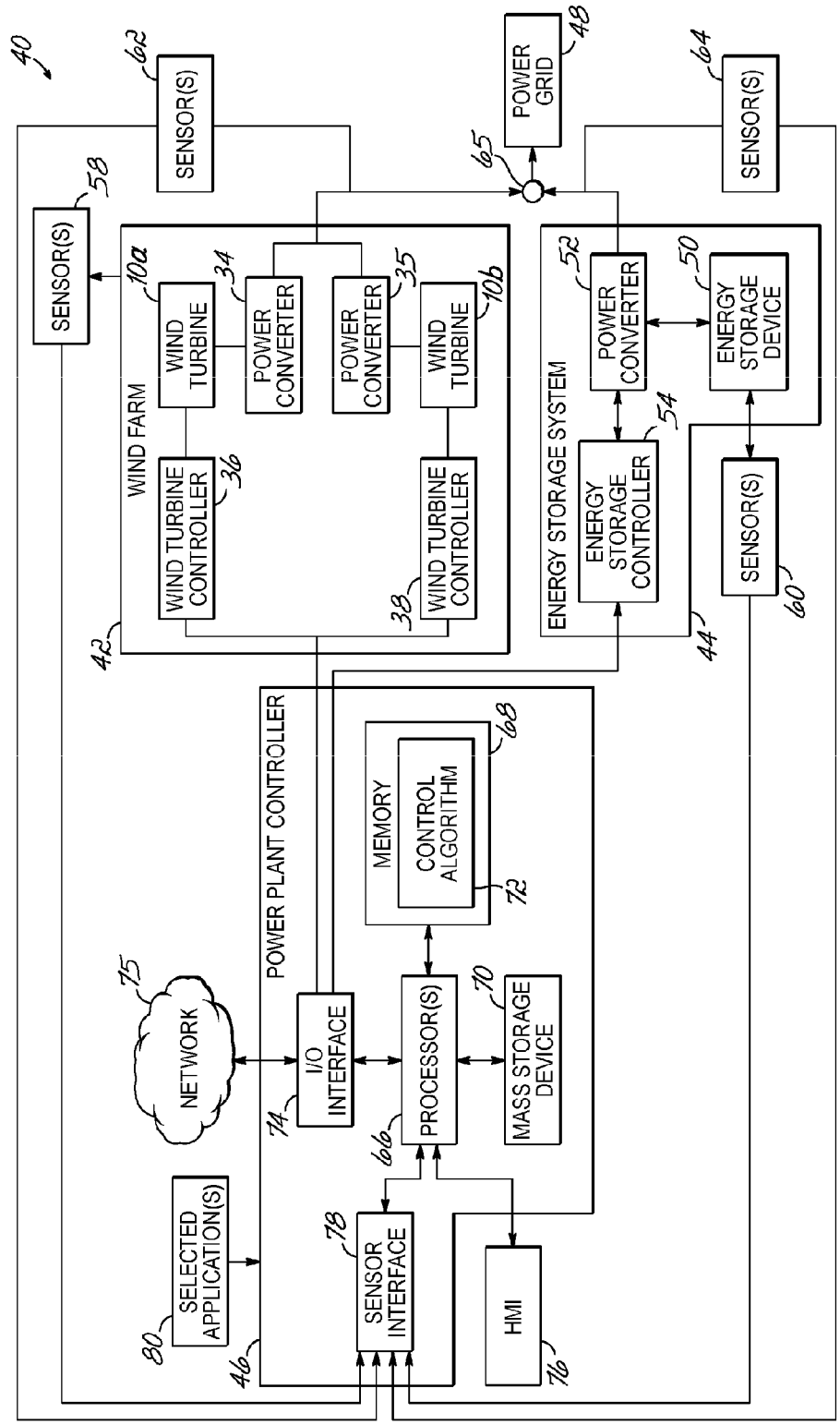
FIG. 3 is schematic view of a power plant and its control scheme.
Figure 4:
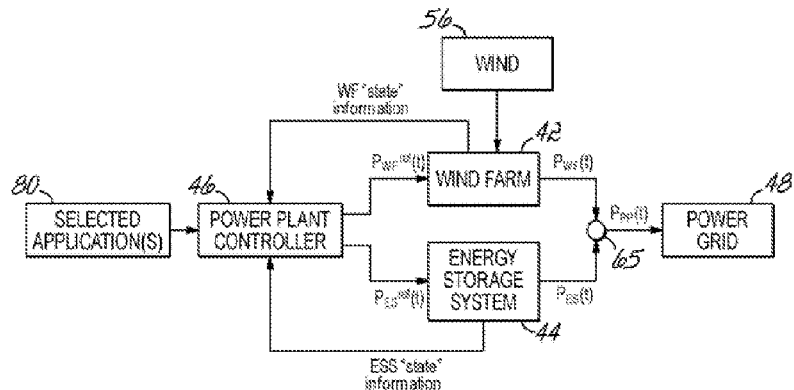
FIG. 4 is a more generic view of a power plant and its control scheme.

With reference to FIGS. 3 and 4, a power plant 40 includes a wind park or wind power plant 42 containing a group of wind turbine generators 10a, 10b sited at a common physical location and an energy storage system 44, as well as a power plant controller 46 that provides supervisory control over the power plant 40. The power plant 40 is electrically coupled with a power grid 48, which may be a three-phase power grid. The wind turbine generators 10 each have a construction similar or identical to the construction of the representative wind turbine 10. The wind power plant 42 may contain additional wind turbine generators (not shown) like the representative wind turbine generators 10 such that the total number of wind turbines in the wind power plant 42 is arbitrary within reason. In various embodiments, the wind power plant 42 may include from ten (10) to one hundred (100) wind turbines distributed over tens of square kilometers of land area.

In an embodiment the virtual power plant is distributed over a large geographical area, but each power producing unit is controlled directly or indirectly by the power plant controller 46.

A power converter 34, 35 is configured to receive the AC voltage generated by the generator 20 of each of the wind turbines 10a, 10b and to supply an AC voltage to the power grid 48. Each of the wind turbines 10a, 10b includes wind turbine controller 36, 38 that manages the operation of the wind turbine components and subsystems by implementing, for example, pitch controls, yaw controls, generator controls, etc. In one aspect of turbine management, each of the wind turbine controllers 36, 38 is coupled in communication with a respective one of the power converters 34, 35 and generates controls signals for power output that are supplied to the power converter 34, 35. In response to the control signals, each power converter 34, 35 rectifies the AC voltage from the generator 20 of the wind turbine 10a, 10b to obtain a filtered DC voltage and then converts the DC voltage to an AC voltage at a desired constant frequency (e.g., 50 Hz or 60 Hz) that is output as three-phase alternating current (AC) to the power grid 48. The wind turbine controllers 36, 38 may control the functions of other sub-controllers that locally control parts of each wind turbine 10a, 10b, such as pitch control over the blades 24 of the rotor 16.

The energy storage system 44 includes an energy storage device 50, a power converter 52, and an energy storage controller 54 that manages the operation of the power converter 52. The energy storage device 50 is coupled with the power grid 48 and is in parallel arrangement with the generators 20 of the wind turbines 10a, 10b in wind power plant 42. The energy storage controller 54 is coupled in communication with the power converter 52 and generates controls signals that are supplied as commands to the power converter 52.

In the representative embodiment, the energy storage device 50 includes one or more rechargeable batteries. Exemplary batteries based upon electro-chemical storage batteries include, but are not limited to, lead-acid, lithium ion, and vanadium redox batteries. In alternative embodiments, the energy storage device 50 may be a different type of device, such as a flywheel or a bank of capacitors, capable of receiving and stably storing electrical energy, and also capable of discharging the stored electrical energy under the control of the power plant controller 46.

Different types of energy storage devices 50 perform differently, especially with respect to response time, e.g. electro-chemical storage batteries are limited by the chemical properties, some are fast and some are slow. Based on the requirement for response time an optimal storage device can be selected in respect of lifetime.

In another alternative embodiment, the energy storage device 50 may be hybrid in the sense that energy storage device 50 may include devices of different types, such as one or more flywheels, one or more banks of capacitors, one or more rechargeable batteries, or combinations of these devices.

In an embodiment the energy storage device 50 is configured to be charged by the wind turbines and/or draw power from the grid.

The energy storage controller 54, in conjunction with the wind turbine controllers 36, 38, controls the ability of the energy storage device 50 to receive and store energy from the wind turbines 10a, 10b in wind power plant 42. Excess energy produced by the wind turbines 10a, 10b may be stored in the energy storage device 50. In response to control signals from the respective wind turbine controllers 36, 38, the power converters 34, 35 are configured to divert electrical energy produced by the generators 20 of the wind turbines 10, 10b to the power converter 52 of the energy storage device 50. The power converter 52 is configured to adjust the voltage level of the DC voltage for compatibility with the energy storage device 50 and route the DC voltage to the energy storage device 50, which stores the electrical energy contained in the DC voltage.

At the direction of control signals received from the energy storage controller 54, the power converter 52 may be directed to discharge stored energy in a controlled manner as DC voltage from the energy storage device 50 to the power converter 52. The power converter 52, which is similar to power converters 34, 35, is configured to receive the DC voltage output from the energy storage device 50, filter the DC voltage, and then convert the filtered DC voltage to an AC voltage at the appropriate constant frequency. The AC voltage is then output from the energy storage system 44 as three-phase AC power to the power grid 48.

The power plant controller 46 is connected in communication with the wind turbine controllers 36, 38 in the wind power plant 42. Wind 56 interacts with the wind turbines 10a, 10b, as explained above, to generate electrical power from the torque supplied from the rotor 16 to the generator 20. Control signals from the power plant controller 46 are used by each of the wind turbine controllers 36, 38 to dynamically vary the output of the respective of the wind turbines 10a, 10b in wind power plant 42 to meet certain output requirements on the generated electrical power. In response to a control signal received from the power plant controller 46, each of the wind turbine controllers 36, 38 can, for example, control the yaw of the nacelle 14 and rotor 16, and control the pitch of the blades 24 to limit the rotational speed of the respective wind turbine 10a, 10b.

The power plant controller 46 is connected in communication with the energy storage controller 54 serving the energy storage system 44. Control signals from the power plant controller 46 are used by the energy storage controller 54 to regulate the operation of the energy storage device 50 and the power converter 52. In particular, the control signals from the power plant controller 46 are used to regulate the discharge of energy from the energy storage device 50 of the energy storage system 44 and the charging of the energy storage device 50.

The power plant controller 46 is configured to control an amount of electrical power output from the power plant 40 to the power grid 48. The power output from the power plant 40 typically includes a contribution from each of the wind turbines 10 in the wind power plant 42 and a contribution from the energy storage system 44, although the energy storage system 44 may consume power when charging. At a substation, a transformer increases the voltage of the electrical current arriving from the wind power plant 42 for connection over the high-voltage transmission lines with the power grid 48.

At least one sensor 58 measures time-varying data from the wind turbines 10 in the wind power plant 42 to provide time-varying status or state information for variables relating to the operation of each of the wind turbines 10a, 10b. The at least one sensor 58 can monitor various measurable parameters and may include wind sensors, sensors for the mechanical operation of the wind turbines 10a, 10b, voltage sensors, current sensors, and/or any other sensor detecting data relevant for the functioning of the wind turbines 10a, 10b or data from the environment of the wind turbines 10a, 10b. The state information from the least one sensor 58 is communicated to the power plant controller 46 and is correlated at the power plant controller 46 with the state of the wind power plant 42.

At least one sensor 60 measures time-varying data from the energy storage system 44 to generate time-varying status or state information for variables relating to the operation of the energy storage device 50. The at least one sensor 60 can monitor various measurable parameters of the energy storage device 50 and may include voltage sensors, current sensors, and/or any other sensor detecting data relevant for the functioning of the energy storage device 50 and power converter 52. The state information from the least one sensor 60 is communicated to the power plant controller 46 and is correlated at the power plant controller 46 with the state of the energy storage system 44.

At least one sensor 62 measures data for variables relating to the actual time-varying power, $P_{WF}(t)$, output from the wind power plant 42 to a point of common connection 65. At least one sensor 64 measures data for variables relating to the actual time-varying power, $P_{ES}(t)$, output from the energy storage system 44 to the point of common connection 65. The actual time-varying power, $P_{PP}(t)$, output from the power plant 40 during periods of power production includes contributions from both time-varying power, $P_{WF}(t)$, and time-varying power, $P_{ES}(t)$. The time-varying powers $P_{WF}(t)$, $P_{ES}(t)$ may include reactive and active components. The sensors 62, 64 can include voltage sensors for measuring voltage as variable, current sensors for measuring current as a variable, and/or any other sensor detecting data for variables relevant to power detection and measurement. The data from the sensors 62, 64 can be communicated to the power plant controller 46 and continuously updated for computation of the time-varying powers $P_{WF}(t)$, $P_{ES}(t)$ at different instants in time to implementing the real-time control schemes of the embodiments of the invention.

The point of common coupling PCC 65, is the point in the grid where both the at least one wind turbine generator and the at least one energy storage device feed in their power/energy.

The measurement signals referred in the control method can be any combination of either local measurements, i.e. up to PCC 65, or remote measurements provided by a transmission system operator, i.e. beyond PCC, like: bus voltage magnitudes, bus voltage angles, bus frequencies, line active and reactive powers, line currents. (e.g. active power reference reactive power reference, voltage reference, current reference, etc.). The measurements can be considered as a set of measurements where a number of voltage and current values are measured at the same time. In an embodiment the actual measurement is performed with a digital measurement system, and thus the signals are captured in a sample hold system and then digitized afterwards. The control algorithm 72 executing on the power plant controller 46 solves an optimization problem in real-time to provide a predicted power reference, $P_{WF}^{ref}$, representing a decision variable for power production from the wind power plant 42 and a predicted power reference, $P_{ES}^{ref}$, represents a decision variable for power production from the power plant 40 to optimize a given power plant objective. Inputs to the control algorithm 72 for these computations include the time-varying state information for the wind turbines 10a, 10b received from the at least one sensor 58 and the actual time-varying power, $P_{WF}(t)$, output from the wind power plant 42 that is measured by the at least one sensor 62.

The power plant controller 46 dynamically issues the control reference signal, $P_{WF}^{ref}$, as a series of set points or commands to the wind turbine controllers 36, 38 of wind turbines 10a, 10b in the wind power plant 42. The set points or commands contained in the control reference signal, $P_{WF}^{ref}$, may include a vector containing a series of future settings for active power and reactive power for the wind power plant 42. The control reference signal, $P_{WF}^{ref}$, is implemented at the wind power plant 42 by control signals communicated from the power plant controller 46 to the wind turbine controllers 36, 38. The control signals represent operational directives that are coordinated such that the individual wind turbines 10a, 10b of the wind power plant 42 effectively act as a single power production unit.

The wind power plant 42 responds to the control reference signal, $P_{WF}^{ref}$, communicated from the power plant controller 46 to the wind turbine controllers 36, 38 by adjusting the power generation or production from one or more of the individual wind turbines 10a, 10b in the wind power plant 42. The response of the wind power plant 42 to the power production commands is based upon the individual responses for each of the wind turbines 10a, 10b. The power production for the wind power plant 42 is a composite of the power production from each of the individual wind turbines 10a, 10b.

The control algorithm executing on the power plant controller 46 computes the decision variable, $P_{ES}^{ref}$, as a control reference signal targeted as a predicted power production of the energy storage system 44. Inputs to the control algorithm 72 for this calculation include the time-varying state information for the energy storage system 44 received from the at least one sensor 58 and the actual time-varying power, $P_{ES}(t)$, output from the energy storage system 44 that is measured by the at least one sensor 62, as well as other application-specific inputs and constrains as discussed hereinafter.

The power plant controller 46 dynamically issues the control reference signal, $P_{ES}^{ref}$, as a series of set points or commands to the energy storage controller 54. The set points or commands contained in the control reference signal, $P_{ES}^{ref}$, may include a vector containing a series of future settings for active power and reactive power for the energy storage system 44. The control reference signal, $P_{ES}^{ref}$, is implemented at the energy storage system 44 by control signals communicated from the power plant controller 46 to the energy storage controller 54.

The control reference signals to the wind power plant 42 and the energy storage system 44, may contain both active power set points and reactive power set points together with other operational parameters.

The input signal to the power plant controller 46, is not limited to signals measured within the power plant, it should also include grid monitored signal. Especially for the power oscillation damping and synchronising power embodiments it is important the fed the power plant controller 46 with either measurements or estimates of grid signal.

Figure 5:
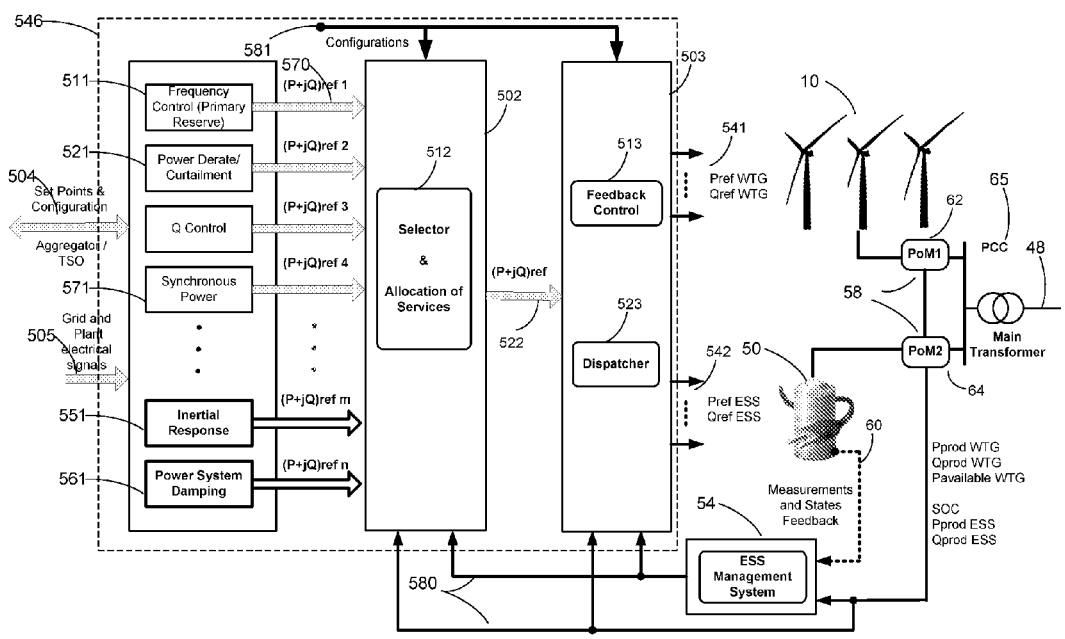
FIG. 5 is architecture of the Multi-Asset Power Plant Controller.

Thus the power plant controller 46 is called MULTI-ASSET POWER PLANT CONTROLLER 546 in FIG. 5.

As mentioned earlier in the application the augmented power plant configuration with the control architecture and algorithms is arranged to provide advanced control functionalities, thereby having a power plant that can offer particular ancillary services, i.e. Primary Reserve (PR), synthetic Inertial Response (IR), Power Oscillation Damping (POD) and Synchronising Power (SP).

Of the many power system stabilising features that can qualify as ancillary services, three of these features of particular interest are listed in Table 1. Only representative numbers are given for the response times and durations. Transmission system operators have started to consider whether wind power plants should offer such services.

TABLE 1

Principles in power plant output provision of ancillary services. Only representative numbers are given for the response times and durations.

| Feature | Expected plant/actuator response | Response time | Duration of delivery |
| --- | --- | --- | --- |
| Primary Reserve (PR) (frequency support) | Active power is changed, up/down, in proportion to deviation in system frequency. | Seconds. | 15 minutes. |
| Inertial Response (IR) | Active power is changed, up/down, in proportion to changes to the time derivative of system frequency. | Tenths of a second. | 10 seconds. |
| Power Oscillation Damping (POD) | Active power or reactive power is changed in proportion to a signal representative of an oscillatory active power flow in the system. | Seconds. | Tens of seconds. |

These listed services are used in this application as examples for demonstrating the capabilities of a wind power plant (WPP) 42 augmented with an energy storage system (ESS) 44.

FIG. 2 depicts a generic power system with wind power in which a severe contingency 220 (e.g. generation loss) is represented. The Figure shows the WPP 42 and ESS 44 feeding active/reactive power P, Q, through a transformer 201a to a power system, through a bus 204a. The power system comprises several buses 204a, 204b, 204c, with consumers 205b and suppliers 210a, 210b, 210c each potentially both feeding active and reactive power to the system.

Depending on the characteristics of the power system and wind penetration level, such an event may demand the provision of these ancillary services in order to maintain the system stability. Thus the power plant 210a (WPP 42 augmented with ESS 44) would support the system with active and/or reactive power injection accordingly. For delivery of these services not only is availability of power required, but also of energy. The amount of the necessary power and energy depends on the service provided.

The Primary Reserve service is intended for delivery of durations up to 15 minutes, during which it must fully support the grid with firm power and energy (either of positive or negative sign).

Figure 7:
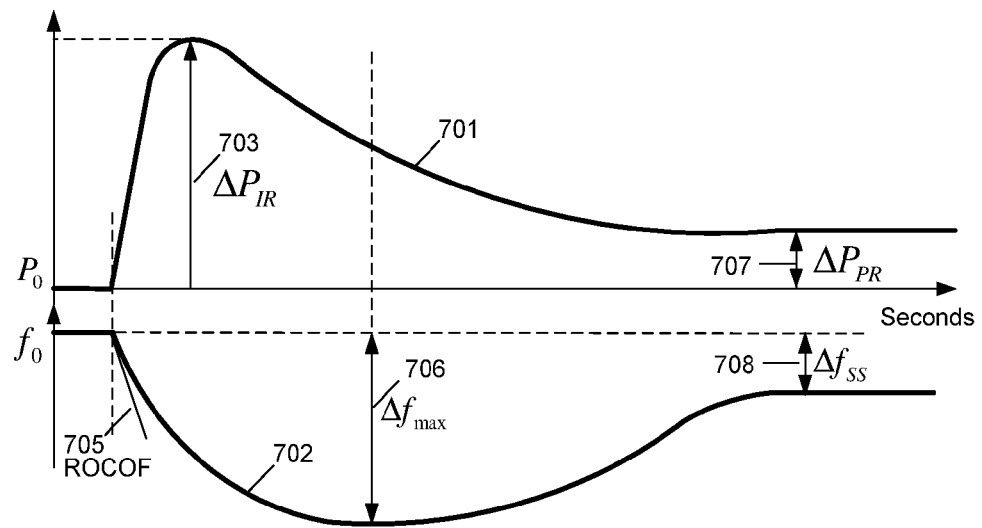
FIG. 7 shows a representative performance of the combined PR and IR features.

The Inertial Response service is intended for supporting the grid with dynamic fast active power injection or absorption during the first seconds following a large power imbalance in the grid (e.g. caused by generation or load loss), with the aim of containing the grid maximum frequency deviation (nadir) inside safe values. FIG. 7 shows a representative performance of the combined PR and IR features during an under-frequency excursion (generation loss). The IR is acting during the first seconds with a relatively large power injection depending on the speed of change of the grid frequency, while the PR keeps acting in steady state in proportion to the steady state grid frequency deviation.

Figure 9:
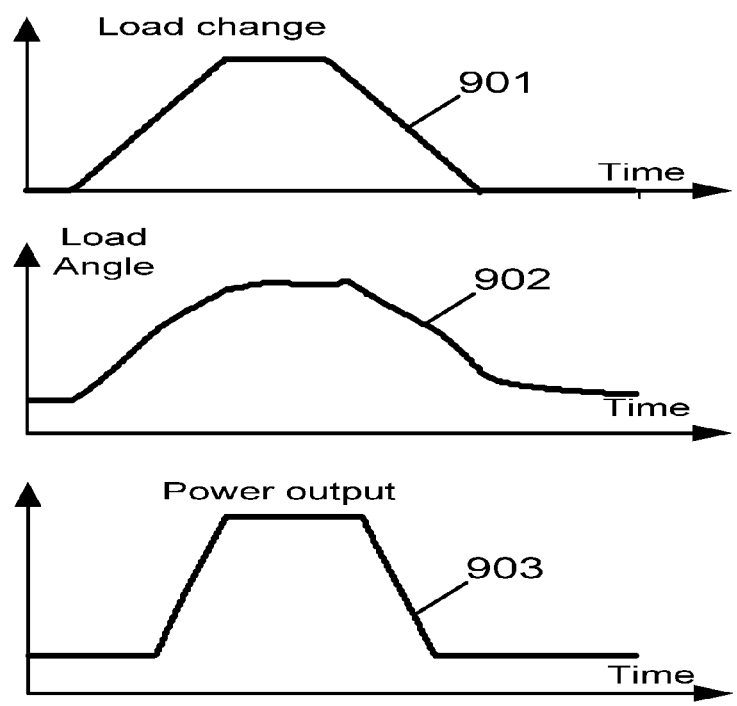
FIG. 9 shows a representative performance of the WPP contribution during synchronizing power control.

The POD service is intended to temporarily support the grid with a dynamic active and/or reactive power modulation in order to dampen power system oscillations. FIG. 9 shows a representative performance of the POD feature in response to a power flow oscillation in a transmission line. The POD response is according to the system oscillation amplitude and frequency to be compensated, with appropriate phase shift.

Each one of these services requires some change in the power output from the augmented plant, either active or reactive power, or a combination of both.

In an embodiment the combined wind power plant and the energy storage system can provide energy for black start. The WPP 42 and ESS 44 acts as a "power plant system" 40 that can work in isolated or standalone mode; it can be energized by itself (using the stored ESS), establishing voltage and frequency in the internal grid; allowing starting and power balancing of the WTGs; and finally able to synchronize to the grid without absorbing any power from the gird 48; furthermore this standalone power plant can provide voltage, frequency and power (to a certain level) to the external grid 48 (the power system or the closest section of it) that is not operating (blacked out), so it can be energized (powered on) from this power plant, therefore starting up the grid 48 operation.

Practical considerations of importance to the achievable performance are discussed based on demonstration experience from a power plant configured with 12 MW wind generation and 1.6 MW energy storage. Sample results are provided from tests of the ancillary services functionality provided by the combined assets, completed with a perspective on the wider usage of such combined plants.

Figure 6A:
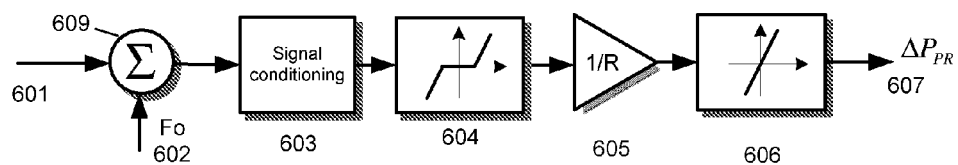
FIG. 6 shows the simplified control structure for three ancillary services.
Figure 6B:
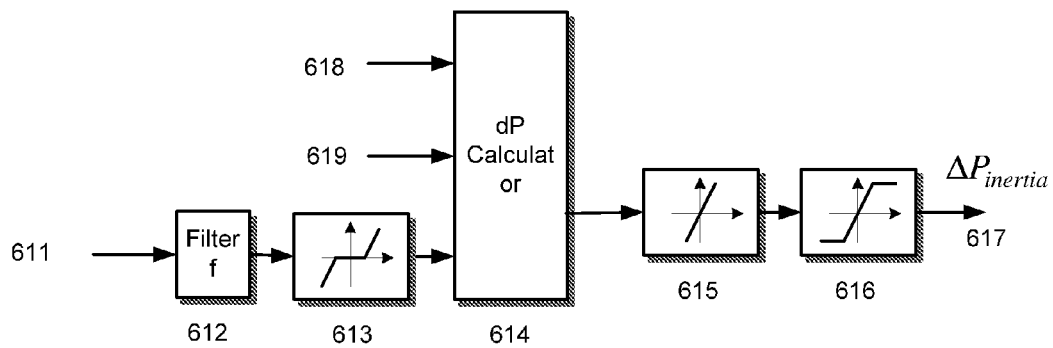
Figure 6C:
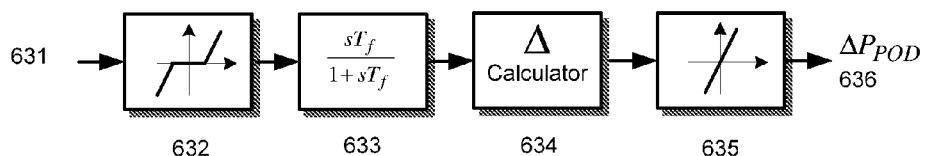

The ancillary services controllers implemented in the power plant controller 46, 546 and tested in the augmented plant are described here. FIG. 6 shows the simplified control structure for each of three presented ancillary services: FIG. 6a: Primary Reserve; FIG. 6b: Inertial Response; FIG. 6c: Power Oscillation Damping, and FIG. 6d: Synchronising Power.

As can be seen in FIGS. 6a and 6b, the grid frequency is the input for the PR and IR controllers, whereas an active power component ($\Delta P_{PR}$ or $\Delta P_{IR}$) is the respective output as a reference component going to the actuator (the ensemble of wind turbines and/or the energy storage system).

In details FIG. 6a shows how to handle the primary reserve ancillary service, an input signal with the actual Grid Frequency 601, being fed to the controller scheme (FIG. 6a). The Grid Frequency 601 is compared to a reference frequency Fo 602 in the summation block 609, the result of the summation 609, is filtered in the filter block 603, for then to be fed to a Dead Band function block 604. The value of the deadband can be given by the Grid Code of the TSO, where the PR actuation is presently not required. Often the deadband falls between 49.98 to infinite Hz (up regulation), or 49.98 to 50.02 Hz (up/down regulation) for 50 Hz systems, and 59.98 to infinite (up regulation), or 59.98 to 60.02 Hz (up/down regulation) for 60 Hz systems, but it is not a world-wide fixed rule. When the input signal falls inside the deadband, the PR service is not require, therefore the Multi Asset Plant Controller can decide to perform other actions with the actuators, e.g. charging ESS batteries 50. The deadband does not have to be a fixed value, but it can be adjusted "online" by the external operator or by the Plant Controller according to optimization. Then to a Droop block 605 with a regulation constant R. The regulation constant R determines the % of frequency change that generates 100% of power change. It is a value that resembles the Conventional Power Plants response. Normally falls between 3% and 5% (R=0.03 to 0.05), but it can be adjusted for enhanced contribution to the power system. The regulation constant R does not have to be a fixed value, but it can be adjusted "online" by the external operator or by the Plant Controller according to optimization or Biding strategy. In this last case, the R will be an "indirect" result of the biding power in the PR market. Finally a Ramp Rate Limiter dP/dt 606, the change in power is limited by a ramp rate, which is to be maximum 10 pu/s, preferably below 5 pu/s. The Output delta power 607 can then be used as an input to the controller block 512 in FIG. 5.

In details FIG. 6b shows how to handle the Inertial Response ancillary service, an input signal with the actual Grid Frequency 611, being fed to the controller scheme (FIG. 6b). The Grid Frequency 611 is passed through a Low Pass Filter 612, then to a Dead-Band 613, for triggering the inertial response. The value of the deadband here is intended to provide inertial response "only" when it's needed, i.e. when a relatively large frequency deviation is detected. Thus tentative values for this deadband can be 49.9 Hz or 49.8 Hz for low frequency events, and 50.1 Hz or 50.2 Hz for high frequency events. (59.9-59.8 Hz and 60.1-60.2 Hz in the 60 Hz systems). For smaller grid frequency deviations (inside deadband) it is considered that the IR activation is not necessary, and other regulation mechanisms can actuate for stabilizing the grid, e.g. PR. The deadband does not have to be a fixed value, but it can be adjusted "online" by the external operator or by the Plant Controller according to optimization or IR enhancement.

The Calculator block 614 uses the output from the deadband 613 together with information on WPP Available Power 618 and information on WPP Actual Power 619 to calculate the required inertial power, the result is limited in Ramp Rate Limiter 615, which Limit the power gradient for inertial contribution, finally the signal goes through a Limitor 616, which limits the absolute power contribution required from WPP to a certain level. The $\Delta P_{inertia}$ change shall be limited by a ramp rate 615, which is expected to be maximum 10 pu/s, preferably below 5 pu/s.

The inertial response contribution shall be limited according to WPP and ESS capabilities.

FIG. 7 shows a system event (e.g. Line Power Flow) where both inertial response and primary reserve is used. The upper Figure shows the injected power 701 as a function of time, with the Inertial response happening first, shown as the power increase 703, and flattening out to a primary reserve level 707. The corresponding lower Figure shows the grid frequency 702 as a function of time. The frequency is limited by a ROCOF 705, which is rate of change of frequency. The max frequency change 706 occurs delayed in respect of the peak power 703. The frequency reaches a stable offset in the end with a level Delta Fss 708.

In details FIG. 6c shows how to handle the Power Oscillation Damping (POD) ancillary service, an input signal with Monitored Grid Variable 631, being fed to the controller scheme (FIG. 6b), the monitored grid variables 631 can be power or voltage, but are not limited to these, the purpose is to identify oscillations in the grid 48. The signal Dead-Band 632 is for triggering the power system damping. The Wash-Out Filter 633, filters for monitored variable, the Additional Power Calculator 634, is an Algorithm for determining the additional plant contribution for POD. A Ramp Rate Limiter 635 Limit the power gradient and might also in some embodiments have a limitor to limit the absolute power contribution required from the Virtual power plant to a certain level. The output is the Output delta power POD 636.

The input signal 631 to the POD controller must be representative of the observed oscillations in the power system. Meaningful measurements include the bus bar voltage magnitude or angle, the power flow in a transmission line or the grid frequency in a generation area.

The POD controller has a structure as shown in FIG. 6c.

The Washout filter 632 is filtering the input signal and removes any high order harmonics that are not of interests. The Lead-Lag block is providing the proper phase compensation desired. It consists of two stage phase compensation and a gain that compensate the attenuation at the desired frequency for which the lead-lag is tuned. The gain is scaling the output to obtain the desired contribution for POD control. The reference signal from POD is limited to the available range allocated for POD.

The POD controller targets a frequency range 0.1 to 5 Hz. Thus, a filter constant of 0.2 sec which corresponds to 5 Hz cut-off frequency is used. This filter will eliminate all frequencies above 5 Hz and will feed into the Lead-Lag only the frequencies of interests.

The overall gain for POD controller is increased until damping of the critical mode reaches the required target level.

In real applications a small-signal stability analysis and hence a tuning of POD controller based on the residue technique will not be straight forward to achieve. This is mainly to the details required on modelling of the power system and getting the modes to be damped by the WPP.

Thus, some practical engineering procedure for tuning shall be applied.

It is expected that system operator (TSO) will provide the frequency of oscillations amplitude 913 from the grid that shall be damped by the wind power installations.

It is also expected that the wind power installations will provide power oscillation damping based on signals measured at the PCC 65. The most suitable In-Out signal pairs to be used for POD controller 561 are:

Magnitude of the voltage;
Magnitude of the current;
Active power;
Reactive power The phase compensation to be achieved by POD controller shall be calculated at least using the known delays in control and actuators. Thus the total delay is calculated as:

$$T_{delay\ total} = T_w + T_{ppc} + T_{com} + T_{actuator}$$

where $T_w$ is the time constant of the wash-out filter, $T_{ppc}$ is the time delays in the power plant controller, $T_{com}$ is the communication time delays between PPC and actuator and $T_{actuator}$ time delays in actuator.

Delays in actuators shall be accounted as overall delays between getting the reference signal to providing the necessary power contribution from actuator as measured at its PCC 65.

The output of the POD controller 561 can be an active and/or reactive power component ($\Delta P_{POD}$ and/or $\Delta Q_{POD}$) as a reference component going to the controller block 502 to be selected in the selector 512.

In an embodiment the delta P, dP is prioritized by the ESS 50, its actuation power may not be enough (due to some limitation) for damping the oscillation properly then the WTGs 10 will support also with a reduced component of delta P (except for the eigenfrequency of the structure).

In an embodiment while delta Q, dQ is prioritized by the WTGs, its actuation power may not be enough (due to some limitation) for damping that oscillation properly then the ESS 50 will support also with a reduced component of dQ.

In an embodiment the ratio of dP/dQ could be constant, but P/Q would not be constant. In a further embodiment dP and dQ can be of distinct frequencies if targeting two different modes in the power system.

Additionally, if there are more than 2 frequencies in the oscillatory event, say 4 frequencies. It is preferred to damp all of them. In an embodiment the POD controller 561 uses dP and dQ from turbines and dP and dQ from ESS, one elemente per frequency. What is most important is the fundamental frequency of the oscillation, thus if there is a limitation to the control it is the fundamental frequency of the oscillation that should be dampend.

If one generator temporarily runs faster than another, the angular position of its rotor relative to that of the slower machine will advance. The resulting angular difference transfers part of the load from the slow machine to the machine, depending on the power-angle relationship. This tends to reduce the speed difference and hence the angular separation. For any given situation, the stability of the system depends on whether or not the deviations in angular positions of the rotors result in sufficient restoring torques.

Figure 8:
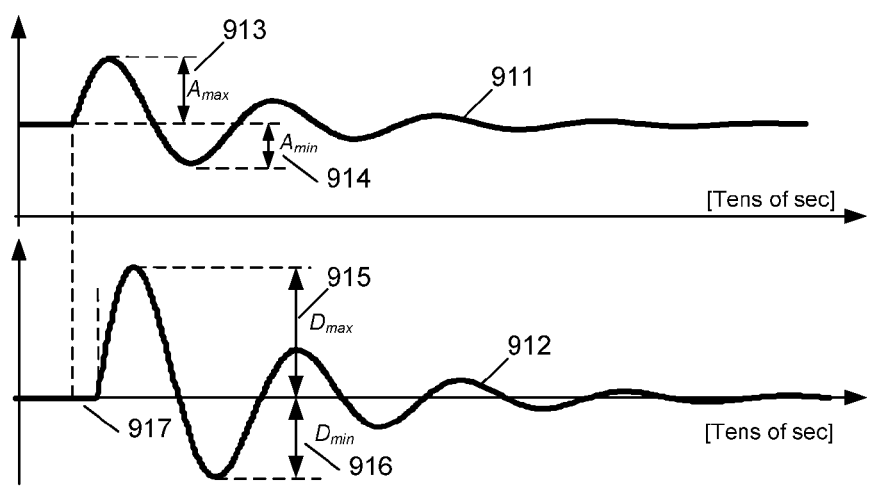
FIG. 8 shows a representative performance of the POD feature in response to a power flow oscillation in a transmission line.

FIG. 8 shows a system event (e.g. Line Power Flow) of where POD is used. The upper FIG. 8, shows the measured/monitored grid variable 911, with oscillations. The peak amplitude 913 is shown and similar the min amplitude 914.

The lower FIG. 8, shows the power response 912. The maximum damping 915 and the minimum damping 916 is identified. It is also important to note a delay 917 in the monitored variables and the response from the virtual power plant.

When a synchronous machine loses synchronism or "falls out of step" with the rest of the system, its rotor runs at a higher or lower speed than that required to generate voltages at system frequency. The "slip" between rotating stator field corresponding to system frequency) and the rotor field results in large fluctuations the machine power output, current, and voltage; this causes the protection system isolate the unstable machine from the system.

Stability is the ability of the power system to maintain synchronism under disturbances. Such disturbances occur continually on the system because of variations in loads and generation. Instability that may result, can be of two forms: (i) steady increase in rotor angle due to lack of sufficient synchronizing torque/power, or (ii) rotor oscillations of increasing amplitude due to lack of sufficient damping torque. The nature of system response to disturbances depends on a number of factors including the initial operating, the transmission system strength, and the type of generator excitation controls used. For a generator connected radially to a large power system, in the absence of automatic voltage regulators (i.e., with constant field voltage) the instability is due to lack of sufficient synchronizing torque.

With electric power systems, the change in electrical torque of a synchronous machine following a perturbation can be resolved into two components:

$$\Delta T_e = T_s \Delta \delta + T_D \Delta \omega$$

where $T_s \Delta \delta$ is the component of torque change in phase with the rotor angle perturbation $\Delta \delta$ and is referred to as the synchronizing torque component; $T_s$ is the synchronizing torque coefficient.

$T_D \Delta \omega$ is the component of torque in phase with the speed deviation $\Delta \omega$ and is referred to as the damping torque component; $T_D$ is the damping torque coefficient.

The angle deviation will be limited according to the power flow. The low-pass filter is expected to have a time constant corresponding to several cycles of the grid frequency. The output of the low pass filter is used to determine the plant contribution for Synchronizing Power which is the limited in terms of ramp rate and absolute vale according to plant capabilities.

To support the synchronizing power between two points in an electrical grid, G1 210*b* and G2 210*c*, see FIG. 2, various input signals have been selected for the VPP 42, 44. These signals can be angle difference and voltage deviation such as rotor angle deviation between G1 210*b* and G2 210*c* ($\Delta\delta 21$) 641, angle difference between Bus2 204*c* and Bus1 204*b* voltage ($\Delta\delta 21$), angle difference between a Bus2 204*c* and a Bus3 204*a* voltage ($\Delta\delta 23$), angle difference between a Bus3 204*a* and a Bus1 204*b* voltage ($\Delta\delta 21$), and Bus3 voltage magnitude deviation ($\Delta V3$).

Figure 6D:
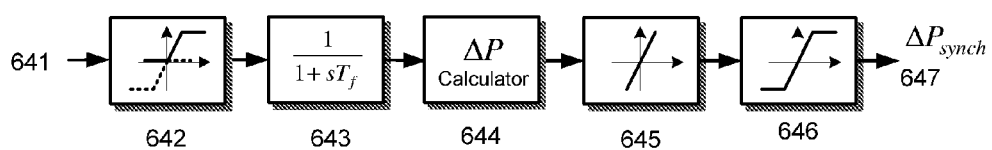

The Synchronizing Power (SP) controller has a structure as shown in FIG. 6*d*, The Synchronizing Power (SP) controller is present as a function in FIG. 5, block 571, the SP controller can be selected as a function equally with the other ancillary service shown in block 501, and selected by the selector 512.

In details FIG. 6*c* shows how to handle the Power Oscillation Damping (POD) ancillary service, an input signal with an angle deviation 641, being fed to the controller scheme (FIG. 6*d*), The Angle deviation 641 will be limited in a Limiter 642 according to the power flow. The signal is the passed through a Low Pass Filter 643. The low-pass filter 643 is expected to have a time constant corresponding to several cycles of the grid frequency. The output of the low pass filter goes to the SP Calculator 644, which is used to determine the plant contribution for Synchronizing Power, this is an Algorithm for determining the additional plant contribution for SP, then the signal goes into a ramp Rate Limiter 645 that limits in terms of ramp rate and absolute vale according to plant capabilities. Then to the Limiter 646, which Limits the power gradient Limit the absolute power contribution required from VPP to a certain level. The output Output delta power SP 647 can then be used as an input to the controller block 512 in FIG. 5.

The power contribution shall be limited based on the available power allocated to this control feature, which is calculated in the block 502 and 512 in FIG. 5. Similar the power gradient shall be limited to a certain value according to capabilities of VPP assets.

This control concept attempts to improve the steady-state stability of the power system by giving an additional power in-feed into the system from the wind power plant, in cases when the power angle rises above a limit value.

The power angle 641 is computed from the difference between the individual voltage angles, and it is always positive since the absolute function is applied on this angle difference. However, the positive or negative value of the raw voltage angle difference is indicating that the power flow has one direction or another. In line with this observation, the design algorithm is having separate power angle limit values according to the sign of the power flow between two different measurement points in the power grid.

The actual power angle—computed as the difference between the individual voltage angles—is subtracted by a power angle limit value $\delta_{lim}$ chosen after comprehensive load flow pre-studies. The limit value is intended to signal the situation when one or more of the synchronous generators are getting dangerously closed to the stability limit.

The relative difference $\Delta\delta_{rel}$ between the actual and the limit value of the power angle is further limited to positive values, because the control philosophy applies only for relative differences in connection with the overloading of the power corridors.

This relative difference is considered as stimuli into the Synchronizing Power Controller.

The steady-state nature of the control algorithm is given by the filtering of the relative angle difference, and the low-pass filter 643 is expected to have a time constant corresponding to several cycles of the grid frequency. The second order low pass filter 643 has been selected due to a very good response in filtering.

In an embodiment a frequency in the range between 2 to 10 Hz is selected for this filter with a damping around 0.707. The filtered-positive-relative power angle difference is thereafter multiplied.

FIG. 9 shows a system event (e.g. Line Power Flow) of an example of a output waveform wherein SP is used. The upper Figure shows a load in the power system that increases with a ramp 901, while the Virtual power plant responds with a power increase 901 due to load angle 902 increase, therefore synchronous generator power angle remains limited.

In an embodiment a power plant controller 46, 546 can provide one or more ancillary services depending on several parameters, such as power rating, availability and grid parameters.

Each of these power components is treated in a Multi-Asset Power Plant Controller (MA-PPC) 546 as shown in FIG. 5, which then decides in the selector block 512, how the assets should be operated according to the actual state and in order to fulfil the demanded response.

In details FIG. 5 shows, the overall virtual power plant (VPP) with the MA-PPC 546, the wind power plant 42, with a number of turbines 10, together with an energy storage 50, which is controlled by a ESS management system 54, the ESS management system 54 receives data 60 for the ESS 50. The VPP is connected to the grid 48 through a PCC 65. Measurement data are taken from at least two points of measurement 58, 62, 64. The measured data is used for control purposes in the MA-PPC 546 and the ESS management system 54. Among other ways the data is passed 580 to the MA-PCC 546.

The MA-PCC 546 receives a number of set points 504 and grid related measurement 505, about grid conditions. These data are used for deriving the values for the ancillary services 511, 521, 551, 561 etc. Each ancillary service output a signal 570, which is used in the configuration and selector block 502. The selector block 512 decides on availability and other parameters which service to use, here the data 580 is also used, configuration data 581 is also used. The selector block 502 the sends an overall reference 522 to the PPC controller 503, which contains a feedback controller 513 and a dispatcher 523, both known in the prior art. The feedback controller 513 and the dispatcher 523 calculates the set point 541 to the individual wind turbine generator and similar a set point 542 to each energy storage device 50.

The concept of augmenting the Wind Power Plant with an Energy Storage System combines the characteristics of modern wind turbines and energy storage, taking advantage of coordinated control and dispatching strategy of the assets. Thus, the augmented plant as a single entity may not be limited to mimic the characteristics of a conventional power plant, but may offer flexibility and dynamic response beyond those.

Although the present embodiment shows a power plant with wind turbine generators, also known as Wind Power Plant, other power generating unit can be used alone or in a combination, such units can be, but limited to: Solar power plant (photo voltaic, thermal), Wave power plant, micro gas turbines.

The single value outputs ($\Delta$) of each ancillary services algorithm 511, 521, 551, 561, 571 can be added into a single set-point value for the entire plant. This can subsequently be split between plant assets (turbines and storage). The partition depends on the operating strategy and conditions of the assets. As illustrated in FIG. 5.

In an embodiment the individual contributions of active/reactive power from wind power plant and energy storage device can be of similar time-traces (but different amplitudes).

In an embodiment the individual contributions of active/reactive power from wind power plant and energy storage device can of complementary time-traces, as an alternative to the above mentioned embodiment.

A test facility has been established in connection with an existing wind power plant and its substation. Four wind turbines each of 3 MW and two energy storage systems of 0.4 MW (ESS1) and 1.2 MW (ESS2), respectively, are electrically connected in a common substation. The two energy storage systems are both based on Li-ion batteries, with nominal capacities of 0.1 MWh and 0.3 MWh, respectively, i.e. nominal power for 15 minutes. In the example the wind turbines and the storage units are all controlled from the same plant control & dispatch unit.

The demonstration facility has served to implement the ancillary service control algorithms and multi-asset controller & dispatcher. The present application shows samples of the results, as proof-of-concept, demonstrating the combined plant's output when configured for the ancillary services of Table 1, and subject to synthesised stimuli signals, representative of grid disturbances.

In the following power output response examples of the augmented wind plant with energy storage system are shown, recorded for tests of Primary Reserve, Inertial Response and Power Oscillation Damping.

The Energy storage system in the example comprises Li-ion batteries together with electrical and control equipment to connect the batteries to the substation grid. The total energy storage capacity is 0.4 MWh (1.500.000 kJ), or 1.6 MW for 15 minutes, the equivalent of eight minutes of rated power from a single turbine.

In all cases, the grid disturbance is simulated and the recorded waveform stimulates the controller to produce the realised waveforms of active and reactive power.

Figure 10:
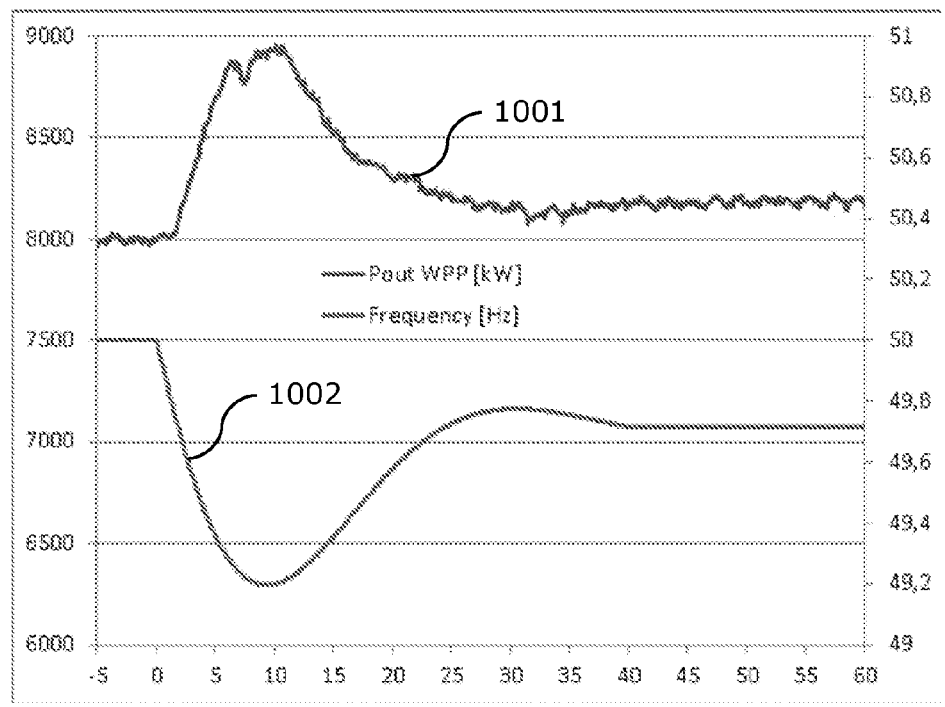
FIG. 10 shows the inertial response of the WPP operating with wind turbines alone.

FIG. 10 shows the inertial response of the WPP operating with wind turbines alone. The response is activated through a fictitious grid frequency signal. WPP providing Primary Reserve and Inertial Response 1001 which was activated through a fictitious grid frequency signal 1002. X-axis is time in seconds. Available wind power was around 9.5 MW.

Figure 11:
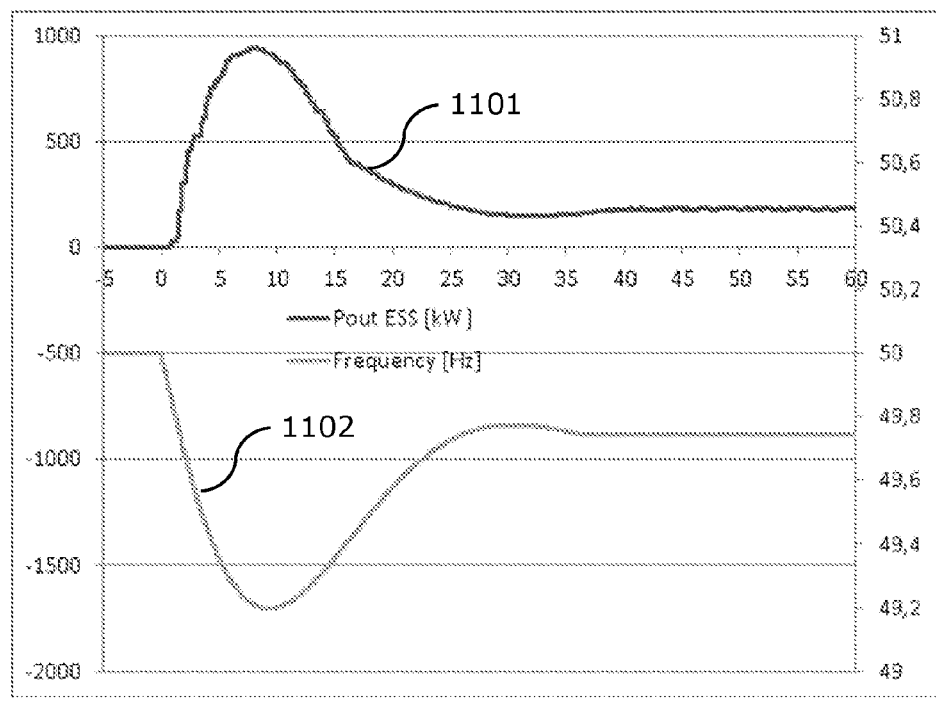
FIG. 11 shows the inertial response of the ESS operating.

FIG. 11 shows the inertial response of the ESS operating. The response is activated through the same fictitious grid frequency signal than in FIG. 10. The ESS providing Primary Reserve and Inertial Response 1101 which was activated through a fictitious grid frequency signal 1102. X-axis is time in seconds. Wind plant was producing available wind power.

The resultant active power modulation waveforms 1001, 1101 in FIGS. 10 and 11 are close, indicating that both the wind turbines and the energy storage systems can track active power setpoint variations with such dynamic content.

Figure 12:
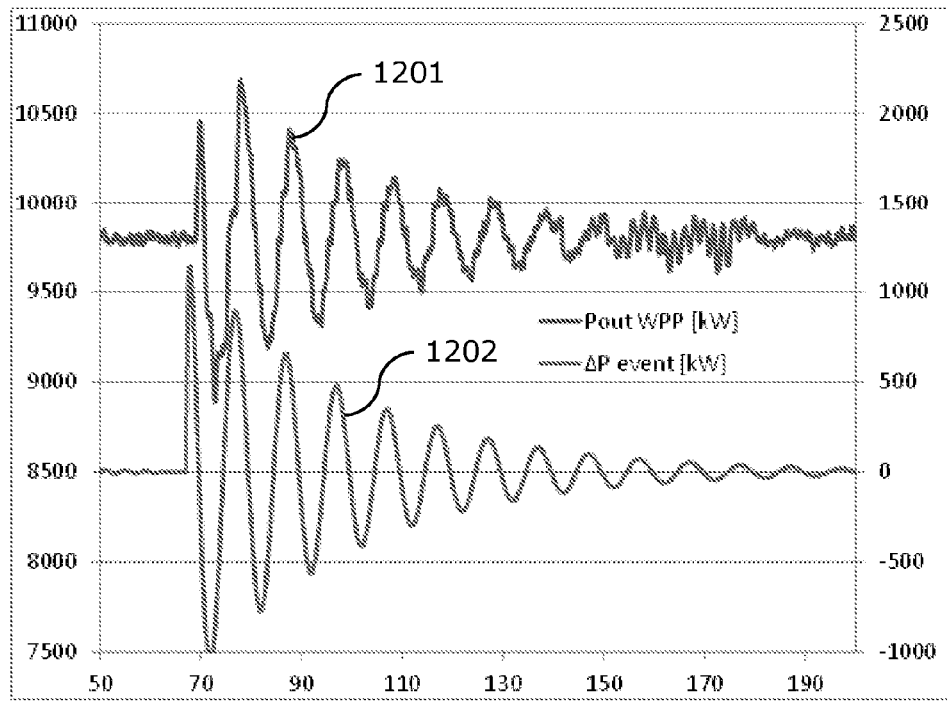
FIG. 12 shows the POD response of the WPP operating with WTGs alone. The response is activated through a fictitious transmission line power oscillation signal.

FIG. 12 shows the POD response of the WPP operating with WTGs alone. The response is activated through a fictitious transmission line power oscillation signal. Where the WPP providing Power Oscillation Damping through Active Power modulation 1201 which was activated through a fictitious system oscillation signal 1202. X-axis is time in seconds. Available wind power was around 7 MW.

Figure 13:
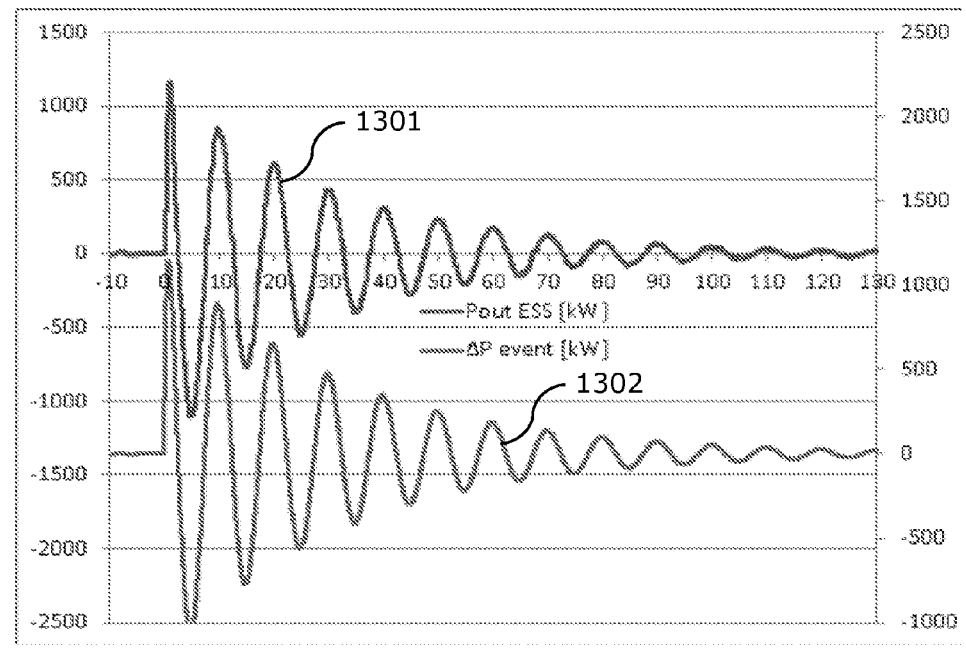
FIG. 13 shows the POD response of the ESS operating alone.

FIG. 13 shows the POD response of the ESS operating alone. The response is activated through the same fictitious transmission line power oscillation signal 1302 than in FIG. 12. The ESS providing Power Oscillation Damping through Active Power modulation 1301, which was activated through a fictitious system oscillation signal 1302. X-axis is time in seconds. Wind plant was producing available wind power.

Figure 14:
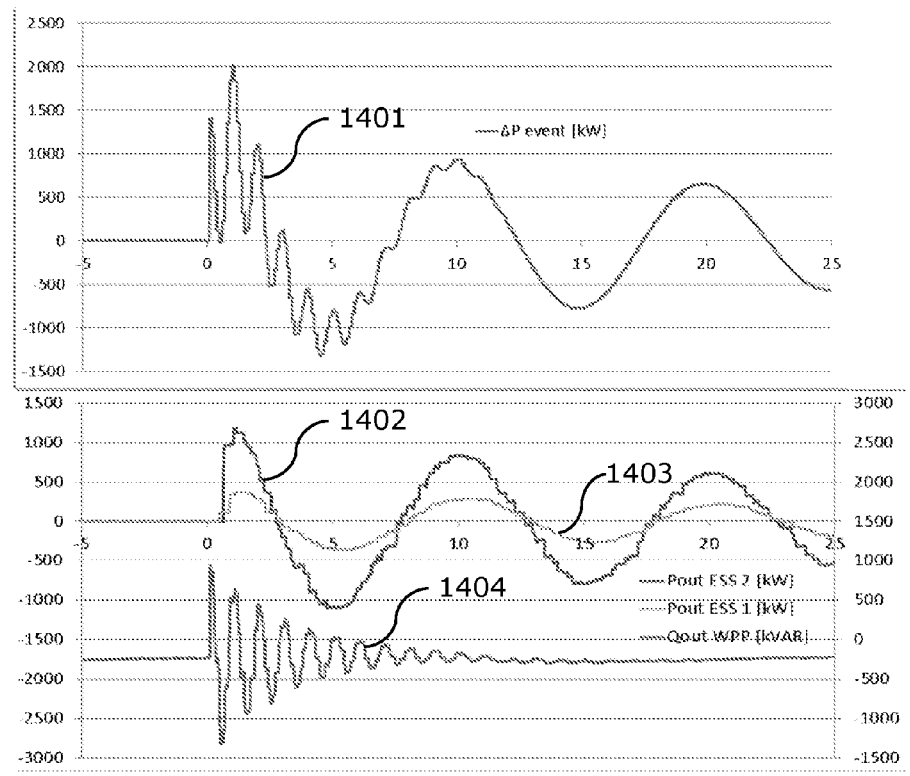
FIG. 14 shows the POD "combined" response of the WPP operating together with the ESS (ESS1+ESS2)

FIG. 14 shows the POD "combined" response of the WPP operating together with the ESS (ESS1+ESS2). The response is activated through a fictitious transmission line power oscillation signal containing two different frequencies 1401. In this case the WPP responds to the higher oscillation frequency through reactive power (Q) modulation 1404, whereas the ESS responds 1402, 1403 to the lower oscillation frequency through active power (P) modulation split between ESS1 and ESS2 (in a ratio of 1.2 to 0.4).

The Fictitious system event 1401 in FIG. 14 contains two combined frequencies activating a combined response of ESS+WPP for Power Oscillation Damping 1402, 1403, 1404. ESS1 and ESS2 with active power output modulation 1402, 1403 and the WPP with Reactive power output modulation 1404. X-axis is time in seconds. Wind plant was producing available wind power.

While active power modulation waveform 1302 of FIG. 13 (ESS) is nearly ideal, the waveform 1202 in FIG. 12 (turbines) shows a relatively small phase-lag. However the waveforms are close, indicating that both the wind turbines and the energy storage system can track active power setpoint variations with such POD dynamic content.

The waveforms 1402, 1403, 1404 in FIG. 14 show that the turbines can be used for relatively fast reactive power modulation, independent of how the energy storage active power is modulated simultaneously, i.e. calculated on the same measurement sample, but at another frequency.

The present application has presented proof-of-concept capability of wind plants augmented with energy storage to allow provision of select power system stabilising features. The concept is combining the characteristics of modern wind turbines and energy storage by using advanced coordinated controls and dispatching strategies of the assets. Thus, the augmented plant as a single entity can have not only characteristics approaching the conventional power plants but also provide flexibility for adaptation to new kind of operations. The present application suggests how fast Energy Storage Systems embedded in Wind Power Plants can contribute to particular ancillary services concerning power system stability.

A practical implementation at utility scale is shown with a 12 MW wind power plant augmented with 1.6 MW energy storage system. In this plant, features for power system stability, i.e. Primary Reserve, Inertial Response and Power Oscillation Damping, have been demonstrated by field tests.

The following can be concluded:

1. It is technically possible to augment the wind power plant with energy storage to provide ancillary services with reduced need for turbine curtailment or overload.
2. A single power plant controller can host ancillary service algorithms and co-ordinate and dispatch between turbines and energy storage devices.
3. Turbines/storage can be operated individually or in combination to deliver adequate ancillary service responses, within technical limits.

Figure 15:
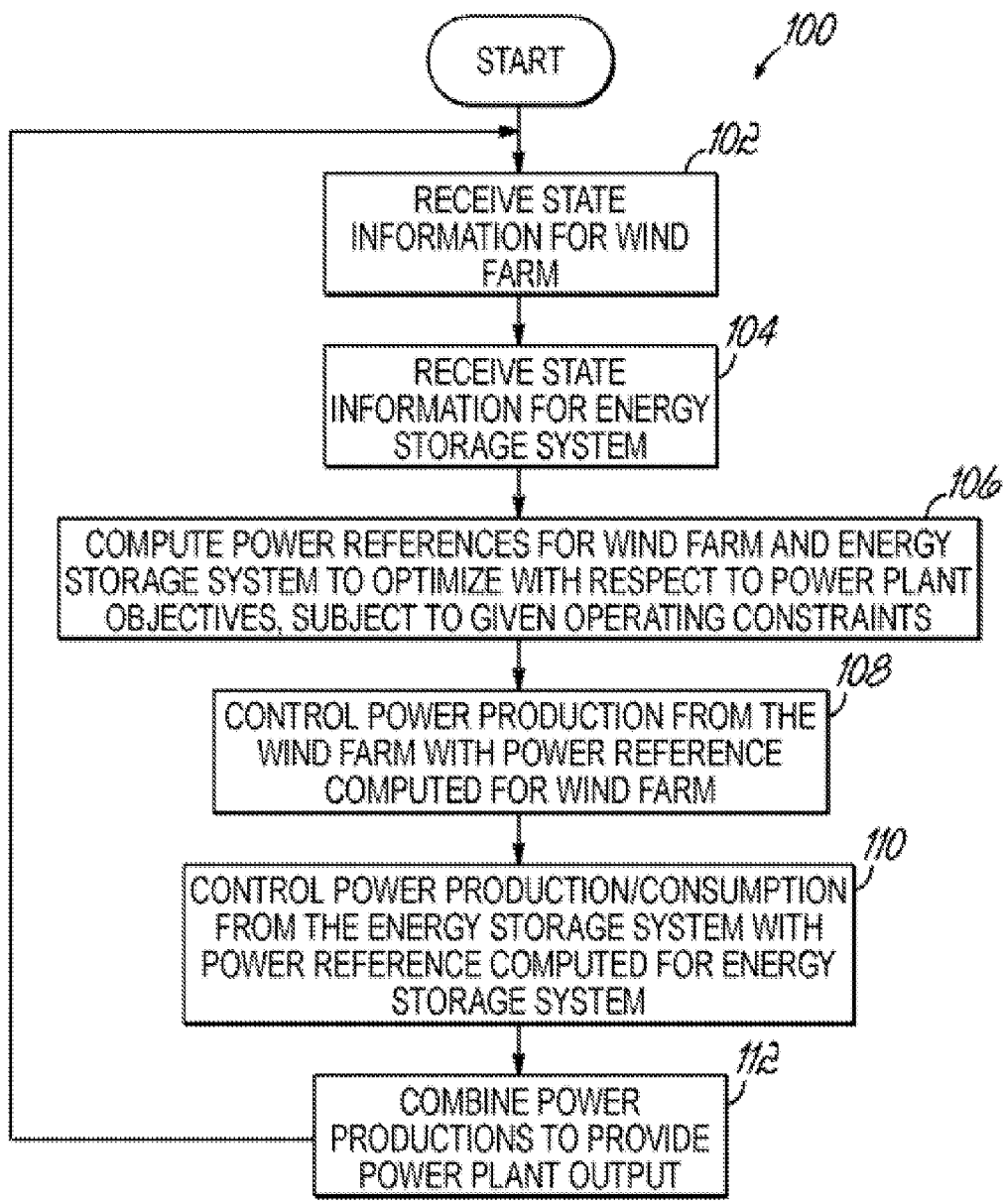
FIG. 15 shows a flow diagram of the method according to the invention.

FIG. 15 shows a flowchart 100 illustrating a sequence of operations for the power plant controller 46, 546 to optimize the operation and output of the power plant 40 consistent with embodiments of the invention. In particular, the power plant controller 46, 546 receives state information 580 regarding the wind power plant 42 supplied from the at least one sensor 58 (block 102). The power plant controller 46, 546 also receives state information 580 regarding the energy storage system 44 supplied from the at least one sensor 60 (block 104). The state information is directed to the processor 66 as inputs to the control algorithm 72, 501, 502, 503.

In block 106, control reference signals are computed by the control algorithm 72, 501, 502, 503 executing on the processor 66 of power plant controller 46. Specifically, the control algorithm 72, 501, 502, 503 as computes the decision variable, $PQ_{WTG}^{ref}$ 541 as an optimal path used as the control reference signal for the future power production of the wind power plant 42 and the control algorithm 72, 501, 502, 503 computes the decision variable, $PQ_{ESS}^{ref}$ 542 as an optimal path used as the control reference signal for the future power production of the energy storage system 44. The control algorithm 72, 501, 502, 503 uses the time-varying state information for the wind power plant 42 and the time-varying state information for the energy storage system 44 at the current time, t, as inputs to optimize a given power plant objective. The computation with the control algorithm 72, 501, 502, 503 inputs one or more ancillary services 511, 521, 551, 561, 571 for the power plant 40, as well as other configuration 581 on the power plant 40 as discussed above, to optimize the given power plant objective. As discussed above, the control algorithm 72, 501, 502, 503 may be a model predictive control algorithm in a representative embodiment.

In block 108, the power plant controller 46 dynamically issues the control reference signal, $P_{WTG}^{ref}$ 541, as a series of predicted set points or commands to the wind turbine controllers 36, 38 of wind turbines 10a, 10b in the wind power plant 42. The control reference signal, $P_{WTG}^{ref}$ 541, sets the power production by the wind power plant 42 as an optimal path of the coordinated control strategy for a relatively short time horizon, t+Δt, in the future.

In block 110, the power plant controller 46 dynamically issues the control reference signal, $PQ_{ESS}^{ref}$ 542, as a series of predicted set points or commands to the energy storage controller 54 of the energy storage system 44. The control reference signal, $PQ_{ESS}^{ref}$ 542, sets the power production or consumption by the energy storage system 44 as an optimal path of the coordinated control strategy for a relatively short time horizon, t+Δt, in the future.

In block 112, the power contributions from the wind power plant 42 and energy storage system 44 are supplied to the point of common connection 65 to provide the power plant output. Only the initial or first step of the optimal path for the control strategy devised by the power plant controller 546 is implemented before the computation is iterated at another control interval with more recent state information for the wind power plant 42 and energy storage system 44. Consequently, the sequence of operations in flowchart 100 then returns to block 102 for the power plant controller 546 to compute another set of control reference signals $PQ_{WTG}^{ref}$ 541 and $PQ_{ESS}^{ref}$ 542 as an optimum predicted control path based upon the time-varying state information for the wind power plant 42 and energy storage system 44 sampled at a future time, t+Δt.

In summary the invention relates to, a method for operating a power plant, with at least one wind turbine generator arranged for supplying power to an electrical grid, at least one energy storage device arranged for supplying power to the electrical grid, and a power plant controller, the method comprises, measuring repetitively measurement sets of at least one electrical parameter from the electrical grid, and calculating, in respect the measurement sets of the at least one electrical parameter, a change in active and/or a required change in reactive power at a point of common coupling, and calculating and dispatching of a first control reference signal to the at least one wind turbine generator and a second control reference signal to the at least one energy storage device, for providing ancillary service functionalities to the electrical grid. The invention also relates to a power plant with at least one wind turbine generator for supplying power to an electrical grid, at least one energy storage device for supplying power to the electrical grid, and a power plant controller for providing ancillary service functionalities to the electrical grid.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for operating a power plant, the power plant comprising at least one wind turbine generator and at least one energy storage device that are each arranged for supplying power to an electrical grid, the method comprising:
   using a set of measurements acquired for at least one electrical parameter of the electrical grid, determining a plant power reference to provide at least one selected ancillary service to the electrical grid, wherein the at least one selected ancillary service is selected from a plurality of predefined ancillary services;
   using the plant power reference, calculating and dispatching a first control reference signal to the at least one wind turbine generator; and
   using the plant power reference, calculating and dispatching a second control reference signal to the at least one energy storage device,
   wherein application of the first control reference signal by the at least one wind turbine generator and application of the second control reference signal by the at least one energy storage device provides the at least one selected ancillary service to the electrical grid.

2. The method according to claim 1,
   wherein calculating the first control reference signal comprises calculating an active power reference and a reactive power reference using the set of measurements, and
   wherein calculating the second control reference signal comprises calculating an active power reference and a reactive power reference using the set of measurements, and
   wherein the first and second control reference signals allow the at least one wind turbine generator and the at least one energy storage device to be operated independent of each other.

3. The method according to claim 1,
wherein the power plant further comprises a power plant controller, and
wherein the power plant controller is divided into a first power plant controller controlling the at least one wind turbine generator, and a second power plant controller controlling the at least one energy storage device.

4. The method according to claim 3, wherein a change in the plant power reference is partitioned between the first control reference signal and the second control reference signal according to a pre-defined ratio.

5. The method according to claim 1, wherein a change in the plant power reference is partitioned between the first control reference signal and the second control reference signal according to an optimization algorithm that is calculated online.

6. The method according to claim 1, wherein the at least one selected ancillary service includes supporting the electrical grid with a primary reserve.

7. The method according to claim 1, wherein the at least one selected ancillary service includes supporting the electrical grid with an inertial response.

8. The method according to claim 1, wherein the at least one selected ancillary service includes supporting the electrical grid with a power oscillating damping.

9. The method according to claim 8, further comprising:
detecting an oscillating disturbance in the electrical grid,
wherein, when the oscillating disturbance has a frequency that is less than or equal to an eigenfrequency of a mechanical structure of the at least one power generator, calculating the first control reference signal comprises calculating an active power reference for damping the oscillating disturbance, and
wherein, when the oscillating disturbance has a frequency that is greater than or equal the eigenfrequency of the mechanical structure of the at least one power generator, calculating the second control reference signal comprises calculating an active power reference for damping the oscillating disturbance.

10. The method according to claim 8, further comprising:
detecting a first oscillating disturbance and a second oscillating disturbance in the electrical grid,
wherein calculating the first control reference signal comprises calculating a reactive power reference for damping the first oscillating disturbance in the electrical grid, and
wherein calculating the second control reference signal comprises calculating an active power reference for damping the second oscillating disturbance in the electrical grid.

11. The method according to claim 1, wherein the at least one selected ancillary service includes supporting the electrical grid with a synchronizing power for stabilizing the electrical grid.

12. The method according to claim 1, wherein the power plant further comprises:
a power generating unit selected from: a photovoltaic solar power plant, a micro gas turbine, a thermal solar power plant, and a wave energy power plant.

13. The method of claim 1, further comprising:
for each of the plurality of predefined ancillary services, determining a respective power reference using the set of measurements,
wherein the plant power reference is determined using at least one respective power reference corresponding to the at least one selected ancillary service.

14. The method of claim 13, wherein the at least one selected ancillary service comprises at least two ancillary services,
wherein determining the plant power reference comprises adding at least two respective power references corresponding to the at least two ancillary services.

15. The method of claim 1, further comprising:
selecting the at least one selected ancillary service using at least:
a first sensor configured to measure parameters relating to power production of the at least one wind turbine generator; and
a second sensor configured to measure parameters relating to power production of the at least one energy storage device.

16. The method of claim 15, wherein selecting the at least one selected ancillary service is further using an available power information for the at least one wind turbine generator.

17. The method of claim 15, wherein selecting the at least one selected ancillary service is further using state of charge information for the at least one energy storage device.

18. The method of claim 15, wherein selecting the at least one selected ancillary service is further using received configuration information.

19. A power plant comprising:
at least one wind turbine generator arranged for supplying power to an electrical grid;
at least one energy storage device arranged for supplying power to the electrical grid; and
a power plant controller configured to:
repetitively acquire measurement sets for at least one electrical parameter of the electrical grid;
using a first set of measurements acquired for the at least one electrical parameter, determine a plant power reference to provide at least one selected ancillary service to the electrical grid, wherein the at least one selected ancillary service is selected from a plurality of predefined ancillary services;
using the power plant reference, calculate and dispatch a first control reference signal to the at least one wind turbine generator; and
using the power plant reference, calculate and dispatch a second control reference signal to the at least one energy storage device,
wherein application of the first control reference signal by the at least one wind turbine generator and application of the second control reference signal by the at least one energy storage device provides the at least one selected ancillary service to the electrical grid.

20. A power plant comprising:
at least wind turbine generator arranged for supplying power to an electrical grid;
at least one energy storage device arranged for supplying power to the electrical grid; and
a power plant controller operable to:
select, from a plurality of predefined ancillary services, at least one ancillary service to provide to the electrical grid;
compute, using a control algorithm, a first power reference for controlling the at least one wind turbine generator; and
compute, using the control algorithm, a second power reference for controlling the at least one energy storage device,
wherein application of the first power reference by the at least one wind turbine generator and application of the second power reference by the at least one energy storage device provides the at least one selected ancillary service to the electrical grid.

\* \* \* \* \*